(12) United States Patent
Fried

(10) Patent No.: US 6,652,227 B2
(45) Date of Patent: Nov. 25, 2003

(54) GAS TURBINE SEAL

(75) Inventor: Reinhard Fried, Nussbaumen (CH)

(73) Assignee: Alstom (Switzerland) Ltd., Baden (CH)

( * ) Notice: Subject to any disclaimer, the term of this patent is extended or adjusted under 35 U.S.C. 154(b) by 0 days.

(21) Appl. No.: 10/131,124

(22) Filed: Apr. 25, 2002

(65) Prior Publication Data

US 2003/0170119 A1 Sep. 11, 2003

(30) Foreign Application Priority Data

Apr. 28, 2001 (DE) .......................... 101 21 019

(51) Int. Cl.$^7$ ................................. F01D 11/12
(52) U.S. Cl. .................... 415/173.4; 415/9; 415/200
(58) Field of Search .................... 415/173.4, 173.5, 415/200, 9

(56) References Cited

U.S. PATENT DOCUMENTS

| | | | |
|---|---|---|---|
| 4,273,824 A | * 6/1981 | McComas et al. | 428/256 |
| 4,299,865 A | * 11/1981 | Clingman et al. | 427/243 |
| 4,422,648 A | * 12/1983 | Eaton et al. | 277/53 |
| 4,669,955 A | * 6/1987 | Pellow | 415/174 |
| 4,728,257 A | 3/1988 | Handschuh | |
| 5,030,060 A | 7/1991 | Liang | |
| 5,064,727 A | 11/1991 | Naik et al. | |
| 5,326,525 A | * 7/1994 | Ghosh | 419/23 |
| 6,093,454 A | * 7/2000 | Brindley et al. | 427/456 |
| 6,358,002 B1 | * 3/2002 | Good et al. | 415/174.4 |

FOREIGN PATENT DOCUMENTS

| | | |
|---|---|---|
| DE | 10057187 A1 | 5/2002 |
| EP | 0965730 A2 | 12/1999 |

OTHER PUBLICATIONS

A. Sickinger et al, "Development of thermal spray layers as gas path for aircraft turbine engines", International Thermal Spray Conference, Essen, May 2, 1983, pp. 140–145.

* cited by examiner

*Primary Examiner*—Edward K. Look
*Assistant Examiner*—J. M. McAleenan
(74) *Attorney, Agent, or Firm*—Adam J. Cermak

(57) ABSTRACT

The invention relates to a gas turbine seal, comprising a metallic component (1) with a durable or erosion-resistant ceramic coating (2) and an abradable ceramic layer (18) which is arranged thereon in locally delimited fashion, a bond layer (5) being arranged on the surface (4) of the metallic component (1), to which bond layer the durable or erosion-resistant ceramic coating (2) is applied as a covering layer. The invention is characterized in that the bond layer (5) comprises separate, adjacent spherical rivets (6) or mushroom-shaped rivets (6) which have a web (7) and a head (8). These rivets form individual metal islands with numerous undercuts (12), around which there is a continuous ceramic network. It is possible to produce very thick layers which have a good bond strength, the ceramic not being flaked away even in the event of introduction of radial/tangential forces, sickle-shaped contact or locally high overheating/frictional heat, and a good sealing action being achieved.

14 Claims, 5 Drawing Sheets

GAS TURBINE SEAL

TECHNICAL FIELD

The invention deals with the field of fluid dynamics. It relates to a gas turbine seal, comprising a metallic component with a durable or erosion-resistant ceramic coating and an abradable ceramic layer which is arranged thereon in locally delimited fashion. Coated components of this type are used, for example, for sealing and thermal insulation between rotating and stationary components in gas turbine installations.

PRIOR ART

It is known that, to increase the efficiency of thermal turbomachines, as far as possible there should be only small clearances between the housing and the rotating blade or vane tips in the compressor and in the turbine, in order to minimize or prevent leaks of air or combustion products between the two components, and thereby to keep losses at a minimum.

One possible way of reducing such leaks is for the tolerances between the stationary and rotating components to be kept as tight as possible during manufacture and assembly of the components. However, this has the drawback that, firstly, the tighter the tolerances between the corresponding components, the higher the costs become and, secondly, on account of the different thermal expansion and contraction of the components interactions take place between these components before, during and after operation, causing wear and other damage to the components.

For this reason, various sealing systems have been developed, for example run-in layers, also known as abradables, which are applied to the surface of the stationary components and into which the rotating components grind during operation.

Known run-in layers are, for example, the classic honeycombs. These comprise thin metal sheets which are soldered on in honeycomb form, are abraded by graning and therefore allow minimal play between the rotating component, for example a rotating blade or vane tip of a gas turbine, and the stationary component, e.g. a stationary housing element of a gas turbine. Honeycombs have web heights of approx. 3 mm to 12 mm and more, so that the rotating counterpart can grind into the run-in layer down to a depth of up to several millimeters.

Since the 1980s, it has also been attempted to produce ceramic flame-sprayed or plasma-sprayed run-in layers, since the turbine inlet temperatures have been increased in order to raise performance and improve efficiency, and for this reason the metallic substrates which are exposed to the high temperatures had to be provided with ceramic protective layers.

It is known from the publication by A. Sickinger and J. Sohngen: Development of thermal spray layers as gas path for aircraft turbine engines. International Thermal Spray Conference, Essen, 02.05.1983 for ceramic material to be sprayed into the honeycombs. In the process, a bond layer with a surface which is as rough as possible, in this case comprising Ni—Cr—Al, is sprayed onto the metallic surface of the base body, for example by means of plasma spraying or flame spraying. The roughness of the surface is used to provide positively locking anchorage for the thermal barrier coating (TBC), comprising a non-metallic material, in this case $ZrO_2$—CaO, which is subsequently likewise plasma-sprayed or flame-sprayed onto this surface. However, on account of the very different coefficients of thermal expansion between metals and non-metallic materials, such as ceramics, these joins are usually only successful up to a layer thickness of <500 $\mu$m. Then, an intermediate layer of $ZrO_2$—CaO+Ni—C is applied, onto which, finally, the run-in layer comprising Ni—C is thermally sprayed. Ceramic layers of this type in the honeycombs have in practice not been used in practice for high loads.

EP 0 965 730 A2 has disclosed a gas turbine air seal, in which, first of all, a thin bond layer comprising aluminum oxide is applied to a base material. In turn, a layer of durable or erosion-resistant ceramic material (TBC) is arranged on this aluminum oxide layer, and finally an abradable ceramic material (run-in layer) is applied to the TBC in locally delimited fashion. A drawback of this arrangement is that it is only possible to achieve relatively small layer thicknesses, which are often insufficient in gas turbine installations, primarily in the final compressor stages or in the turbine stages with a view to achieving a required thermal barrier or required grinding away.

Although it is nowadays also possible, with particularly high levels of outlay, to spray ceramic layers which are approx. 1 mm to 2 mm thick, these layers react very sensitively to the action of external forces. However, particularly in the case of run-in layers, it is necessary to reckon with a relatively substantial stripping action. The introduction of radial/tangential forces, sickle-shaped contact or even locally high overheating/frictional heat cause the ceramic to flake away quickly if the counterpart is not abrasive enough and cuts in quickly.

Therefore, to ensure sufficient bonding without the abovementioned drawbacks of thick ceramic layers on a base body, very coarse holding structures have to be produced on the surface of the base body.

The applicant is aware of various processes, cf. for example DE 100 57 187.5, in which spherical or mushroom-shaped coarse holding structures (anchor points, also known as rivets) for ceramic materials which are to be applied are produced on a metallic surface by a welding or casting process. These ceramic materials are primarily thermal barrier coatings which are used, for example, in gas turbine combustion chambers and are constantly exposed to high thermal loads and sometimes local impact loads.

SUMMARY OF THE INVENTION

The invention attempts to avoid the abovementioned drawbacks of the known prior art. It is based on the object of developing a gas turbine seal comprising a metallic component with a durable or erosion-resistant ceramic coating, for example a thermal barrier coating, and an abradable ceramic layer which is arranged thereon in locally delimited fashion, in which, despite high layer thicknesses of the ceramic of up to approx. 20 mm, a good bond strength is to be achieved, ensuring that the ceramic does not flake away even in the event of the introduction of radial/tangential forces, sickle-shaped-contact or locally high overheating/frictional heat.

According to the invention, in a gas turbine seal in accordance with the preamble of patent claim 1, this is achieved by the fact that the bond layer comprises separate, adjacent spherical rivets or mushroom-shaped rivets which have a web and a head.

According to the invention, the gas turbine seal system comprises a gas turbine seal according to the invention and a rotating component, preferably a rotor blade, which grinds into the abradable ceramic layer.

An advantage in this respect is that with the gas turbine seal according to the invention high ceramic layer thicknesses of up to approx. 20 mm are achieved, these layers having a good bond strength, and the ceramic not being flaked away even in the event of the introduction of radial/tangential forces, sickle-shaped contact or locally high overheating/frictional heat, and a good sealing action being achieved.

Moreover, the use of rivets as a bond layer has the effect of forming a continuous ceramic network with individual metal islands, which has a positive effect on the properties of the layer. For example, in particular the lower heat conduction, the smaller metal surface area exposed to oxidation and the improved anchoring of the ceramic layer achieved with the holding structures according to the invention compared to the network-or lattice-like holding structures which are known from the prior art should be mentioned.

Advantageous configurations of the gas turbine seal are disclosed in subclaims 2 to 12.

It is advantageous that both the layer thickness of the abradable ceramic layer (run-in layer), at approx. 1 to 8 mm, and that of the durable or erosion-resistant ceramic layer (generally plasma-sprayed thermal barrier coating TBC), at 1 to 20 mm, are relatively high compared to the known prior art. This is possible only on account of the excellent possibilities for anchoring the ceramic at the undercuts of the rivets. The height of the rivets can be accurately matched to the particular requirements. It is also possible for the TBC layer to be matched to the particular load conditions, for example it may be of graduated (differing material, i.e. differing ceramics and/or sprayed in a differing density) or ungraduated structure. Finally, the metallic component may also be additionally coated with an oxidation protective layer, to which the TBC layer is then applied.

BRIEF DESCRIPTION OF THE DRAWING

A number of exemplary embodiments of the invention are illustrated in the drawing, in which.

Only the features which are essential to the invention are illustrated in the figures.

WAYS OF CARRYING OUT THE INVENTION

The invention is explained in more detail below with reference to exemplary embodiments and FIGS. 1 to 5.

FIGS. 1 to 5 illustrate sections through four different variants of the gas turbine seal according to the invention. The figures in each case show a blade or vane tip seal.

Figure 1:
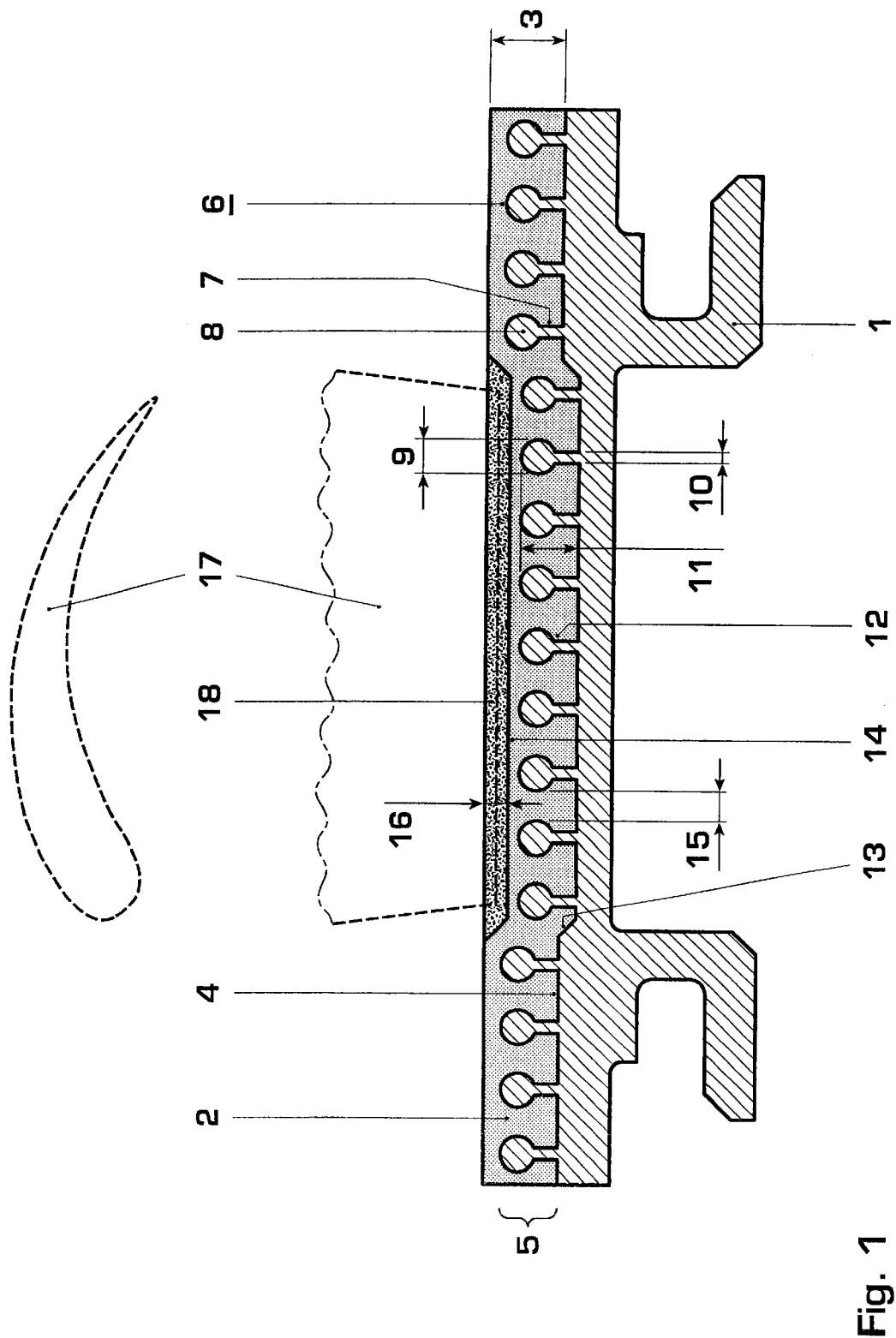
FIG. 1 shows a section through a gas turbine seal in a first design variant of the invention.

FIG. 1 shows a blade or vane tip seal of a gas turbine, which comprises a metallic component 1, on which a durable or erosion-resistant ceramic layer 2, for example a thermal barrier coating comprising yttrium-stabilized zirconia of the following chemical composition: 2.5% of $HfO_2$, 7–9% of $Y_2O_3$, <3% of others, remainder ZrO, is sprayed by means of plasma spraying. Application by means of flame spraying is also possible. The layer 2 has a constant layer thickness 3, i.e. it follows the surface contour of the component 1, which as shown in FIG. 1 does not have a planar surface 4, but rather has a step 13. Therefore, at this location the layer 2 has a cavity 14.

To improve the bond strength of the layer 2, a bond layer 5, which is formed from individual anchor points, in this case referred to as rivets 6, is applied to the surface 4 of the component 1. The rivets 6 may either be cast together with the metallic component 1 or may be separately prefabricated and then welded onto the surface 4.

As shown in FIG. 1, the rivets 6 have a mushroom-shaped structure and have a web 7 and a head 8. They have a constant height 11 and are uniformly distributed over the surface 4, specifically including in the region of the step 13.

It is advantageous if these mushroom-shaped rivets 6 have a head diameter 9 of approx. 0.8 mm to 3 mm and a web diameter 10 of approx. 0.5 mm to 2 mm, as well as a height 11 of approx. 1 mm to 10 mm. This creates very good anchoring possibilities for the ceramic layer 2 which is subsequently to be applied.

The special shape of the rivets 6 results in the creation of a corresponding surface roughness, with the result that the ceramic material (layer 2), which is to be applied in the liquid state, forms a positively locking join with the metallic component 1, i.e. corresponding undercuts 12 are formed by the rivets 6, in the form of spaces between the rivets 6 and the metallic component 1 (base body), into which undercuts the ceramic material flows or becomes caught, thus producing a firm join between the non-metallic material and the metallic material.

It is essential that a defined surface roughness with sufficient undercuts 12 be produced, so that a high strength and, above all, also a relatively high layer thickness 3, which is preferably 1 to 20 mm, of the ceramic layer 2 are achieved. This is the required condition for ensuring that the ceramic does not flake away even in the event of the introduction of radial/tangential forces, sickle-shaped contact or locally high overheating/frictional heat.

The distance 15 between two adjacent heads 8 of the rivets 6 should preferably be approx. 1 to 5 times the diameter 9 of the heat 8. Greater distances are also conceivable.

As shown in FIG. 1, an abradable ceramic layer 18 (run-in layer), the thickness 16 of which is preferably 1 to 8 mm, has been introduced into the cavity 14 in the durable or erosion-resistant ceramic layer 2. This layer 18 completely fills the cavity 14. While the gas turbine installation is operating, the rotating rotor blade 17 grinds into the layer 18, so that a very good sealing action is produced. The run-in layer 18 consists of ceramic material, preferably TBC material, which, however, is sprayed on in significantly more porous form than the thermal barrier coating. These ceramic materials for the run-in layers 18 have to be sprayed on in a form which is sufficiently porous for them to break into small grains under the stripping action of the rotor blade 17.

Figure 2:
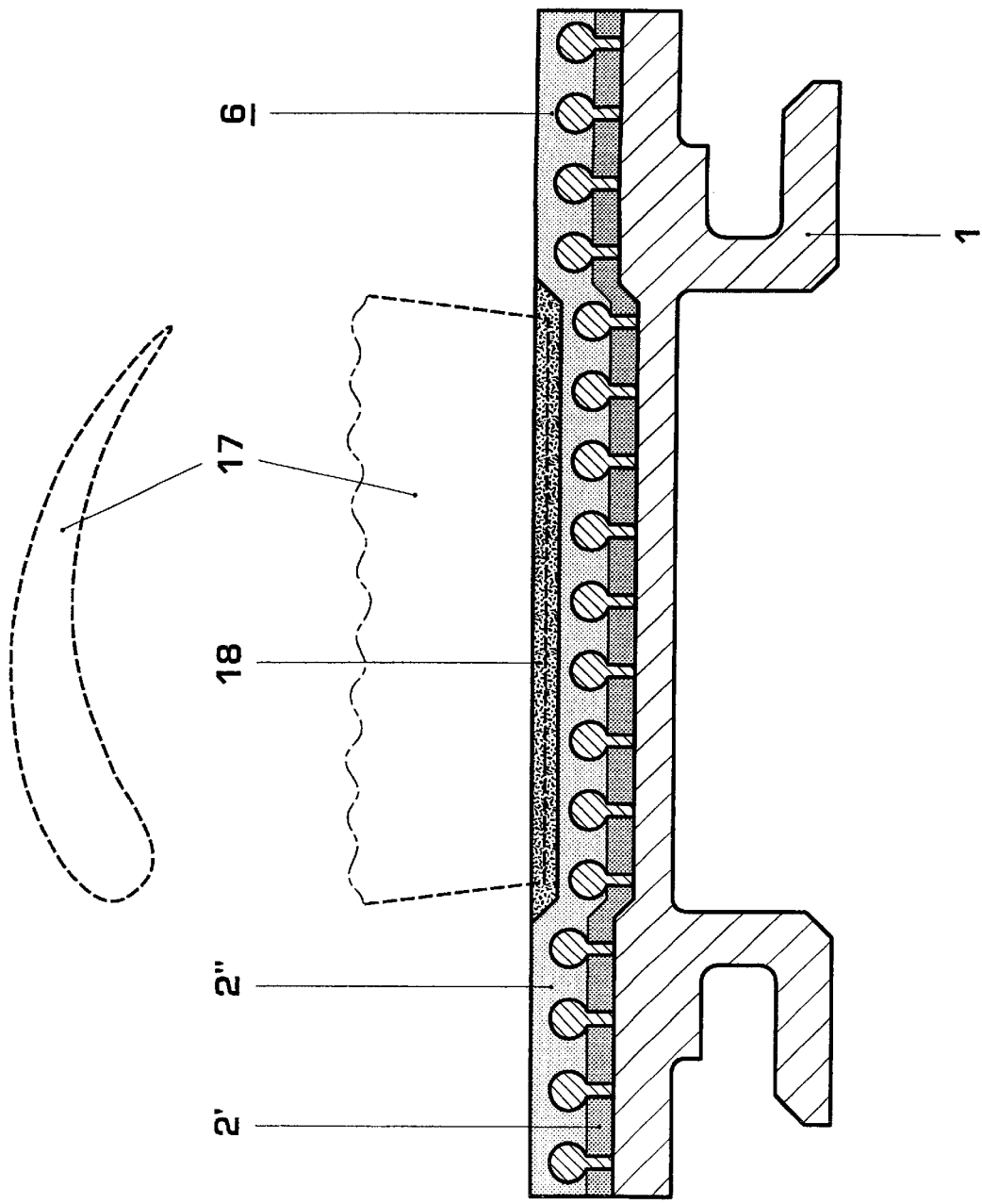
FIG. 2 shows a section through a gas turbine seal in a second design variant of the invention.

FIG. 2 illustrates a second exemplary embodiment. It differs from the example shown in FIG. 1 only in that the durable ceramic layer 2 is applied in graduated form, i.e. it has either a different density (partial layer 2' and partial layer 2") or it consists of ceramic materials with differing chemical compositions.

Figure 3:
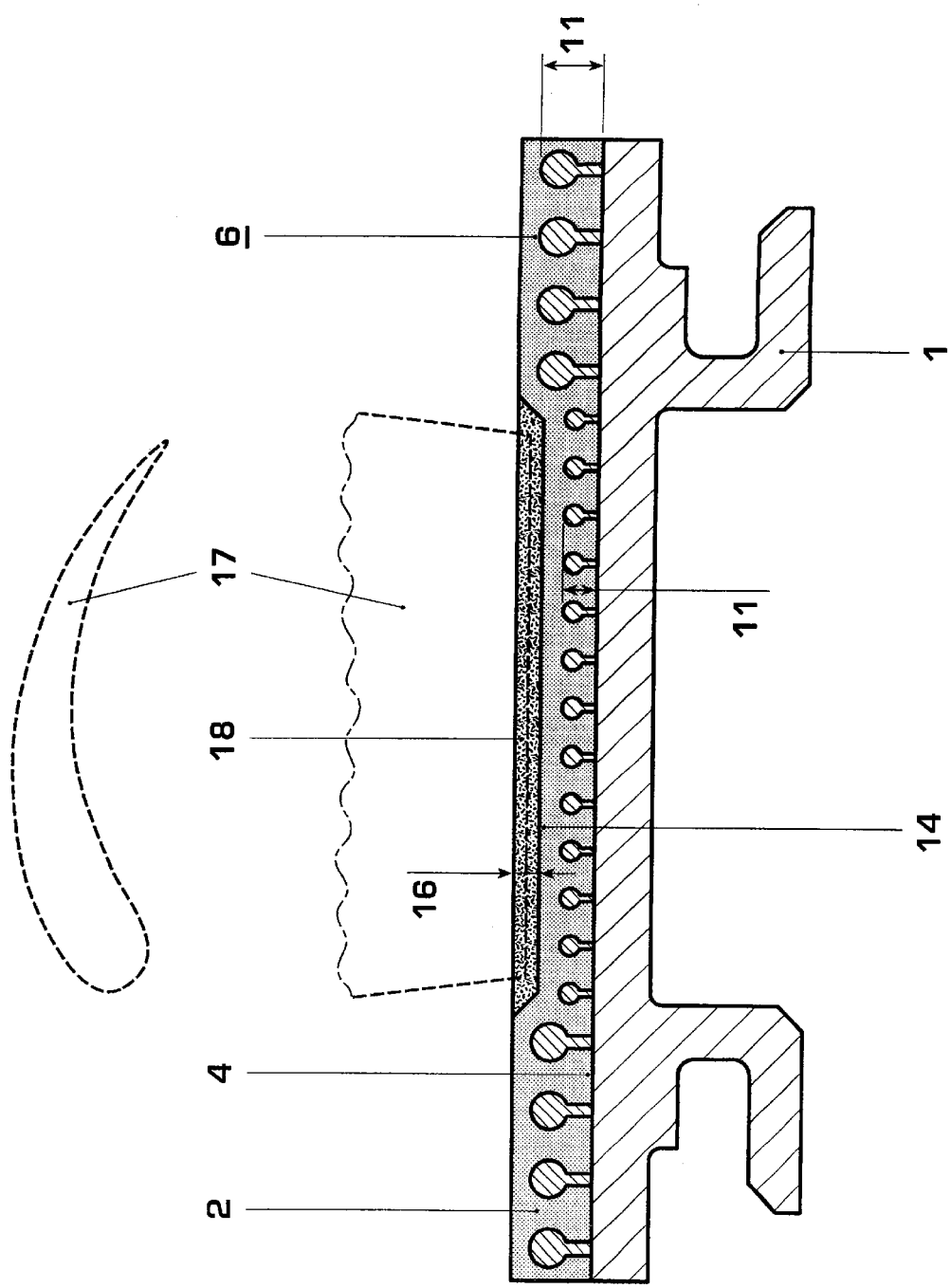
FIG. 3 shows a section through a gas turbine seal in a third design variant of the invention.

FIG. 3 shows a section through a third exemplary embodiment of the invention. In this case, the metallic component 1, unlike the first two exemplary embodiments, has a planar surface 4. The thickness 3 of the ceramic layer 2 is not constant, but rather differs locally. At the location with the cavity 14, it is less, at 4.5 mm, than at the outer locations, at 8 mm. Once again, the abradable ceramic layer 18 is introduced into the cavity 14, and the rotor blade 17 grinds into the ceramic layer 18 while the gas turbine is operating. In this exemplary embodiment, the layer thickness 16 of the run-in layer 18 is 3.5 mm. Unlike the first two exemplary embodiments, the height 11 of the rivets 6 is matched to the respective layer thickness 3, i.e. in the region of the abradable ceramic layer 18 the rivets 6 are smaller (3 mm) than in the other regions (5.5 mm). In addition to the lower height 11 mentioned above, they also have a smaller head diameter 9.

Figure 4:
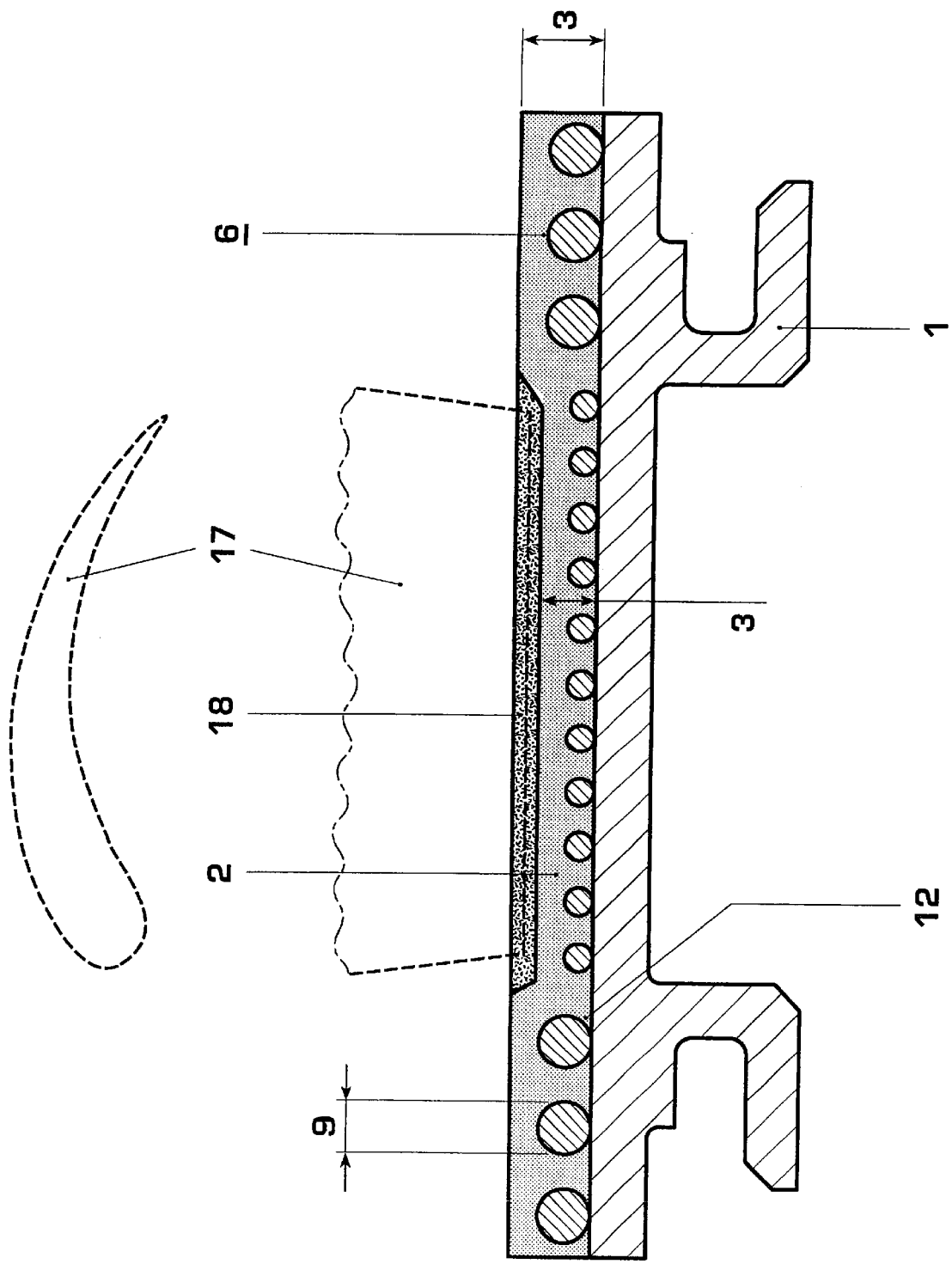
FIG. 4 shows a section through a gas turbine seal in a fourth design variant of the invention.

Naturally, it is also possible to use spherical rivets 6, as illustrated in FIG. 4, in addition to the mushroom-shaped rivets 6 described above. This fourth exemplary embodiment is similar to the third, except that the shape of rivet differs. The spherical rivets 6 (FIG. 4) have a diameter 9 which is in the range from 0.5 mm to 3 mm. This geometry too produces large undercuts 12, leading to a high bond strength of the ceramic materials on the metallic component 1 or the bond layer 3, so that the ceramic does not flake away even in the event of the introduction of radial/tangential forces, sickle-shaped contact or locally high overheating/ frictional heat. Spherical rivets 6 with a smaller diameter 9 are arranged at the region in which the run-in layer 18 is locally arranged than at the other locations, since in the region of the layer 18 the ceramic layer 2 arranged below it also has a lower thickness 3 than at the other locations.

Figure 5:
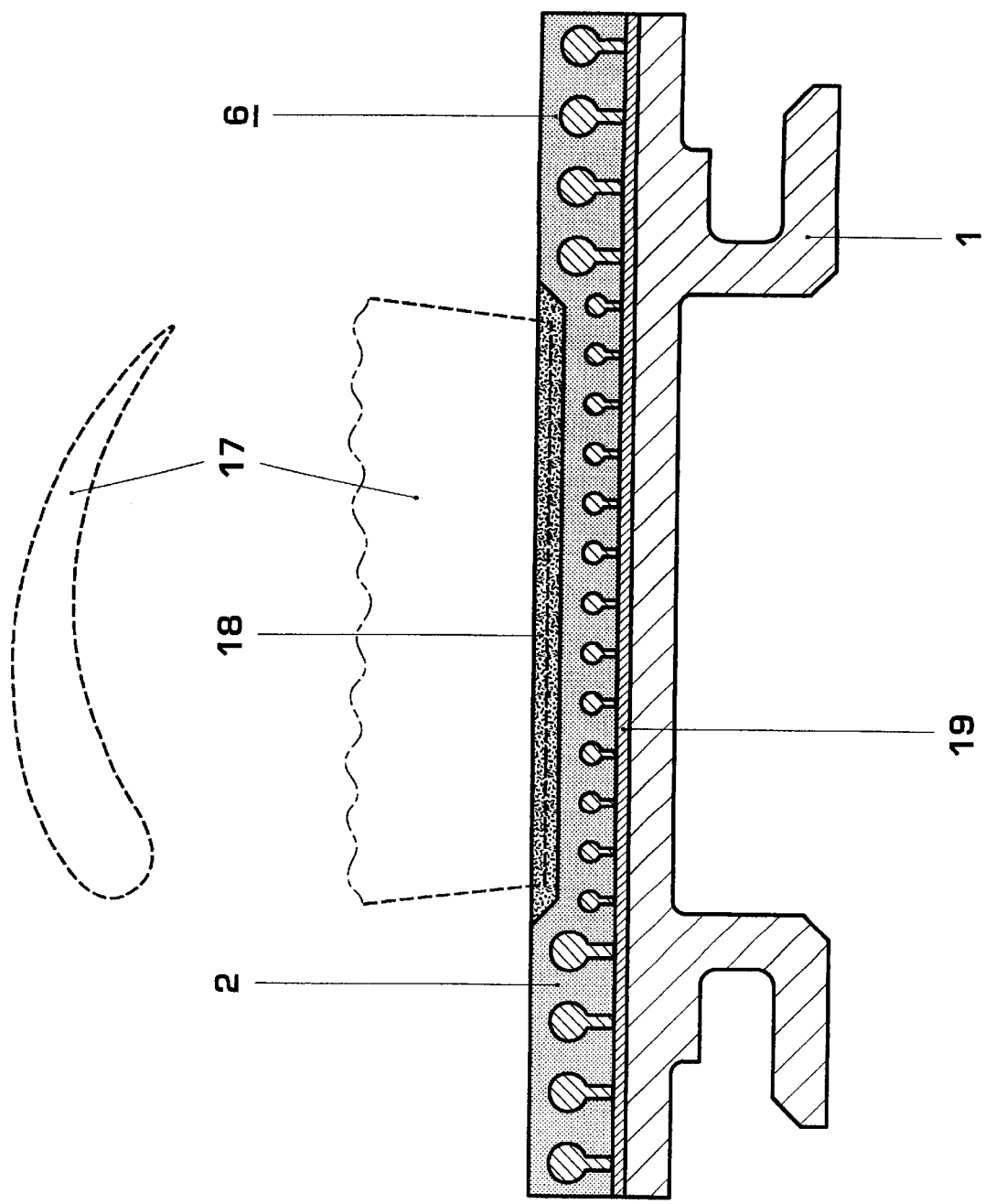
FIG. 5 shows a section through a gas turbine seal in a fifth design variant of the invention.

Finally, FIG. 5 illustrates a design variant which differs from the variant illustrated in FIG. 3 only in that an oxidation protective layer 19 comprising MCrAlY is additionally welded onto the surface 4 of the metallic component 1. The rivets 6 may then be welded on either in, on or through this layer and then the TBC layer 2 and the abradable ceramic layer 18 are applied.

Of course, the invention is not restricted to the exemplary embodiments described.

What is claimed is:

1. A gas turbine seal, comprising a metallic component (1) with a durable or erosion-resistant ceramic coating (2) and an abradable ceramic layer (18) which is arranged in thereon locally delimited fashion, a bond layer (5) being arranged on the surface (4) of the metallic component (1), to which bond layer the durable or erosion-resistant ceramic coating (2) is applied as a covering layer, characterized in that the bond layer (5) comprises separate, adjacent spherical rivets (6) or mushroom-shaped rivets (6) which have a web (7) and a head (8).

2. The gas turbine seal as claimed in claim 1, characterized in that the abradable ceramic layer (18) has a thickness (16) of approx. 1 mm to 8 mm.

3. The gas turbine seal as claimed in claim 1, characterized in that the durable or erosion-resistant ceramic layer (2) has a thickness (3) of approx. 1 mm to 20 mm.

4. The gas turbine seal as claimed in claim 1, wherein the durable or erosion-resistant ceramic layer (2) has a constant thickness (3).

5. The gas turbine seal as claimed in claim 1, wherein the durable or erosion-resistant ceramic layer (2) locally has a different thickness (3).

6. The gas turbine seal as claimed in claim 4, characterized in that the durable or erosion-resistant ceramic layer (2) has a cavity (14) in which the abradable ceramic layer (18) is arranged.

7. The gas turbine seal as claimed in claim 1, characterized in that the mushroom-shaped rivets (6) have a diameter (9) of the head (8) of approx. 0.8 mm to 3 mm and a diameter (10) of the web (7) of approx. 0.5 mm to 2 mm.

8. The gas turbine seal as claimed in claim 1, characterized in that the mushroom-shaped rivets (6) have a height (11) of approx. 1 mm to 10 mm.

9. The gas turbine seal as claimed in claim 1, characterized in that the spherical rivets (6) have a diameter (9) of approx. 0.5 mm to 3 mm.

10. The gas turbine seal as claimed in claim 1, characterized in that the distance (16) between two adjacent heads (8) of the rivets (6) is approximately 1 to 5 times the diameter (9) of the head (8).

11. The gas turbine seal as claimed in claim 1, characterized in that the rivets (6) have a height (11) which is matched to the thickness (3) of the durable or erosion-resistant ceramic layer (2).

12. The gas turbine seal as claimed in claim 1, characterized in that the durable or erosion-resistant ceramic layer (2) is of graduated structure, i.e. consists of differing material and/or has a differing density.

13. The gas turbine seal as claimed in claim 1, characterized in that an oxidation protective layer (19) is additionally applied to the surface (4) of the metallic component (1).

14. A gas turbine seal system, comprising the gas turbine seal as claimed in claim 1 and a rotating component, preferably a rotor blade (17), which grinds into the abradable ceramic layer (18) during operation of the gas turbine.

* * * * *